United States Patent [19]

Rongley

[11] 4,222,246
[45] Sep. 16, 1980

[54] SLIP CLUTCH

[75] Inventor: Raymond A. Rongley, Newtown, Pa.

[73] Assignee: Roller Bearing Company of America, West Trenton, N.J.

[21] Appl. No.: 968,253

[22] Filed: Dec. 11, 1978

[51] Int. Cl.² ............................................. F16D 7/02
[52] U.S. Cl. ................................................. 64/30 E
[58] Field of Search .................. 64/30 R, 30 E, 28 R; 74/531; 192/89 R; 403/371, 372

[56] References Cited

U.S. PATENT DOCUMENTS

| | | | |
|---|---|---|---|
| 2,302,110 | 11/1942 | Dow et al. | 64/30 R |
| 3,212,296 | 10/1965 | Benjamen | 64/30 R |
| 3,424,287 | 1/1969 | Dreiding | 64/30 R |
| 3,541,810 | 11/1970 | Kendall | 64/28 |
| 4,097,756 | 6/1976 | Gee | 403/372 |
| 4,103,516 | 8/1978 | Marcin | 64/30 E |

Primary Examiner—Peter M. Caun
Attorney, Agent, or Firm—Zachary T. Wobensmith, 2nd; Zachary T. Wobensmith, III

[57] ABSTRACT

A slip clutch of the friction type is described for interposition between a rotary shaft and a driven or driving element on the shaft, such as a gear, cam, pulley, crank or the like, the slip clutch including a split sleeve in engagement with the element or the shaft but retained against movement by a key carried in a keyway on the shaft or in the element, a split tolerance ring being interposed between the split retainer ring and the shaft or the element and retained against rotation with respect to each other and to the shaft or the element in the shaft by the key. The gear, cam, pulley and the like is retained against longitudinal movement along the shaft in any desired manner such as by a shoulder on the shaft and a split retainer ring in a groove on the shaft or by a pair of spaced retainer rings in grooves on the shaft.

12 Claims, 5 Drawing Figures

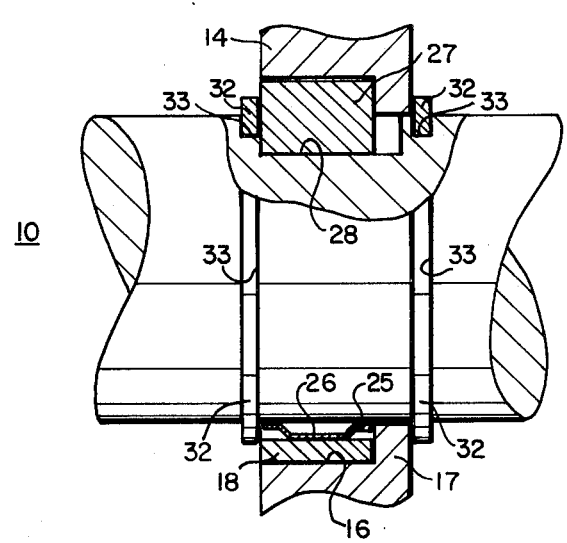
FIG. 3
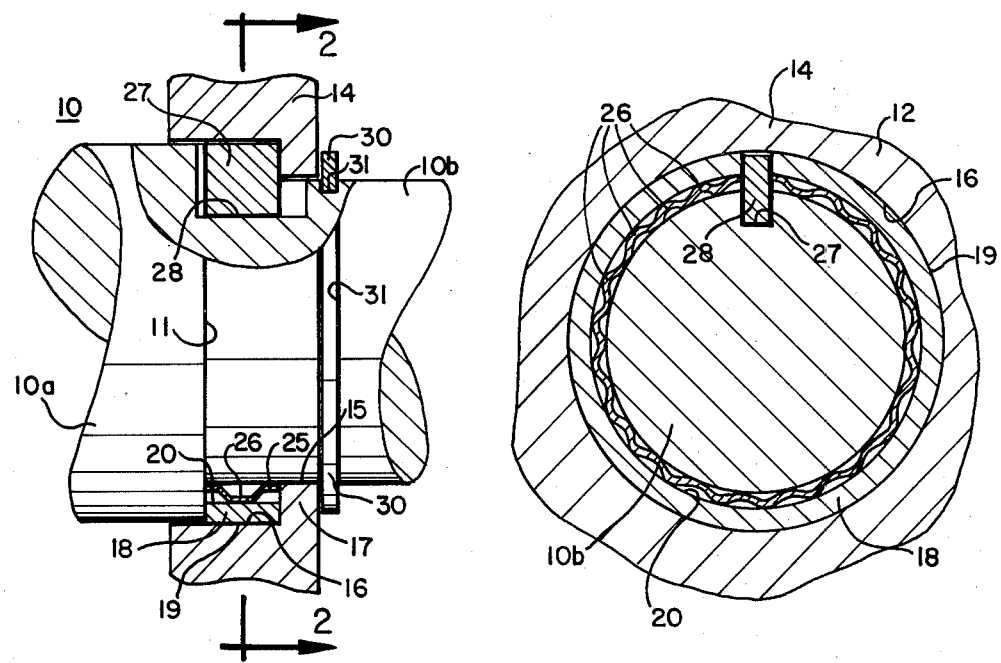
FIG. 1
FIG. 2

SLIP CLUTCH

BACKGROUND OF THE INVENTION

1. Field of the Invention

This invention relates to slip clutches for interposition between a rotary shaft and an element carried on the shaft such as a gear, cam, pulley or the like.

2. Description of the Prior Art

It has heretofore been common practice to mount elements, such as gears, cams, pulleys, cranks and the like on a shaft, the element or the shaft providing the power input if desired. The elements may be freely rotatable with respect to the shaft or may be held against rotation by a key or set screw.

It has also been common practice to hold the element against longitudinal movement lengthwise of the shaft. Fritz, in U.S. Pat. No. 1,095,839, and Newton et al., in U.S. Pat. No. 2,406,891 show split rings in spaced relation in grooves on the shaft for preventing longitudinal movement of the element along the shaft.

In Osborne, U.S. Pat. No. 2,066,482, a clutch mechanism of the synchronizing type is shown for connecting the gear 8 to the shaft 3 or for connecting the driving and driven shafts together for direct drive, splines being employed for this purpose. Retainer or abutment rings are provided to hold the gear against longitudinal movement on the shaft with a locking key 25 engageable with the rings. No overload release clutch is shown nor such a clutch with few parts.

In U.S. Pat. No. 3,061,386 a tolerance ring is described comprising a corrugated elastic shim or expansion sleeve in which each corrugation acts as a compression spring to create a frictional grip on the parts it contacts. Such devices have been employed to secure synthetic plastic devices which may lack dimensional stability, distortion during curing and incompatible thermal expansion rates, to shafts. Such devices have also been employed to mount anti-friction bearings in stamped or drawn sheet metal housings and in die cast housings, and to mount knobs to levers.

None of the prior art devices heretofore available show a slip clutch in which the pressure is applied in a comparable manner by using a tolerance ring for that purpose nor for inexpensively and economically constructing a slip clutch which only requires three relatively simple parts.

SUMMARY OF THE INVENTION

In accordance with the invention a slip clutch is provided for interposition between a shaft and an element carried on the shaft, the slip clutch comprising a split sleeve engaging the element or the shaft, a tolerance ring having a plurality of corrugations engaging the sleeve and the element or the shaft and in which each of the corrugations acts as a compression spring forcing the split sleeve into frictional engagement with the element or the shaft, and a key engaging the element or the shaft and preventing relative rotation of the split sleeve and the tolerance ring with respect to the element or the shaft as the case may be. The slip clutch components and the elements are held against longitudinal axial movement on the shaft.

It is the principal object of the invention to provide a slip clutch of the friction type which is simple in construction, is very economical to construct and install, and which has a minimum number of parts.

It is a further object of the invention to provide a slip clutch of the friction type in which simple but effective structure is provided for applying the force necessary for the friction.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a view partly in elevation and partly in vertical section of one embodiment of a slip clutch in accordance with the invention;

FIG. 2 is a transverse sectional view taken approximately on the line 2—2 of FIG. 1;

FIG. 3 is a view, similar to FIG. 1, showing another embodiment of the invention;

Figure 4:
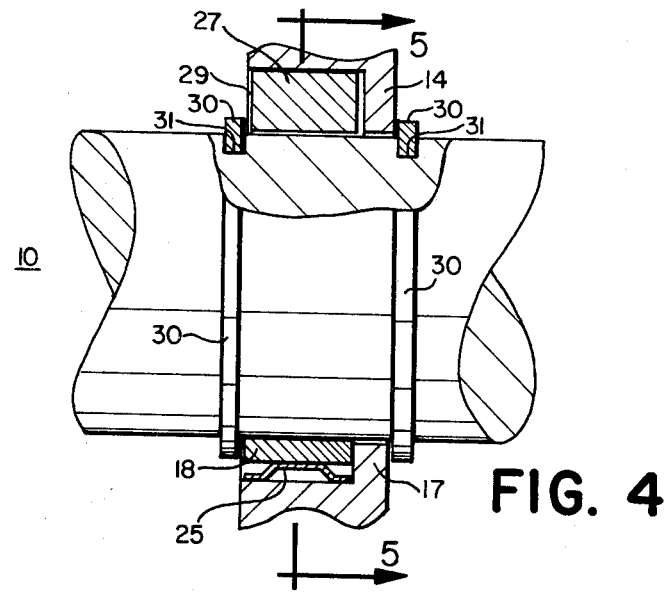
FIG. 4 is a view similar to FIG. 1, showing another embodiment of the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to FIGS. 1 and 2 of the drawings, one embodiment of the invention is there shown.

A rotatable operating element or shaft 10 is provided having a shaft portion 10a of predetermined diameter and a shoulder 11 from which a shaft portion 10b, of reduced diameter extends.

A rotatable operating element 14 in surrounding relation to the shaft 10 is shown generally at 14, and may be a gear, cam, pulley, crank or the like, Dependent upon the specific mechanism either the shaft 10 or the element 14 may be the driving component with the other being the driven component.

The operating element 14 has a bore 15 of the same internal diameter as the external diameter of the shaft portion 10b and an axially aligned bore 15 extending from the bore 14 toward the shoulder 11 of substantially the same diameter as that of the shaft portion 10a thus providing an inwardly extending rim 17.

Within the bore 16 a split sleeve 18 is provided, preferably rectangular in transverse cross section with its outer peripheral face 19 in engagement with the bore 16 and having an inner face 20.

Interposed between the split sleeve 18 and the exterior of the shaft portion 10b a split circumferentially disposed ring 25 is provided of the type known as a tolerance ring. This ring 25 is an elastic metallic shim, made of thin flat spring steel, with a plurality of transverse corrugations 26 extending outwardly from one face thereof and with the ends of the corrugations terminated inwardly of the side margins so that each corrugation can act as a compression spring to exert a frictional grip, when forced in place, against the ring 18 and its inner face 20. The ring may be as shown in U.S. Pat. No. 3,061,386.

A key 27 is provided, preferably rectangular in cross section and carried in a keyway 28 in the shaft 10, is interposed between the ends of the split ring 18, and of the force applying ring 25, to limit their circumferential movement.

It will be noted that the split sleeve 18, the ring 25, and the key 27 are confined against longitudinal movement with respect to the shaft 10 by the shoulder 11 and the rim 17.

The element 14 is restrained against longitudinal movement on the shaft 10 in one direction by the sleeve 18 and the key 27 and in the other direction by a split retainer ring 30 in a circumferential groove 31 on the shaft portion 10b.

In the embodiment of the invention shown in FIG. 3, the shaft 10 is of uniform diameter.

A split sleeve 18 and ring 25 are provided as before with the sleeve 18 engaging the bore 16. The key 27 is engaged in a keyway 28 in the shaft 10.

Split retainer rings 32, engaged in ring grooves 33 on the shaft 10, prevent longitudinal displacement of the element 14 on the shaft 10.

Figure 5:
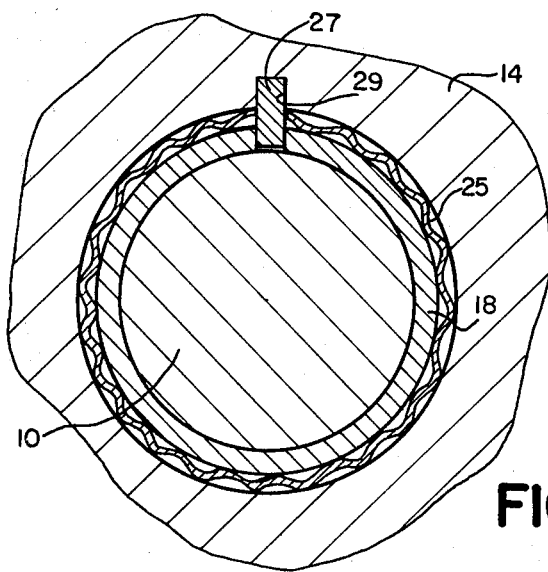
FIG. 5 is a transverse sectional view taken on the line 5—5 of FIG. 4.

In the embodiment of the invention shown in FIGS. 4 and 5 the shaft 10 is of uniform diameter and the split sleeve 18 is shown in engagement with the shaft 10 with the ring 25 between the sleeve 18 and the bore 16 of the element 14. The key 27 is engaged in a keyway 29 in the element 14. Split retainer rings 32, engaged in ring grooves 33 on the shaft 10, prevent longitudinal displacement of the element 14 on the shaft 10.

The mode of use will now be pointed out.

The ring 25 is assembled between the split sleeve 18 and the outer face of the shaft 10 as shown in FIGS. 1, 2 and 3, or between the split sleeve 18 and the bore 16 of the element 14 as shown in FIGS. 4 and 5.

A greater or lesser force may be required for insertion, dependent upon the spring force desired to be exerted by the corrugations 26.

Upon driving either the shaft 10 or the element 14 relative rotary movement between the two is normally prevented by the frictional engagement of the sleeve 18 in the bore 16 or with the exterior surface of the shaft 10. The frictional engagement is maintained by the force exerted by the corrugations 26 of the ring 25. Relative rotation of the sleeve 18 and the ring 25 is prevented by the key 27.

In the event that an undue force is exerted either on the shaft 10 or the element 14, the frictional engagement between the split sleeve 18 and the element 14 or the shaft 10 will be overcome and slipping will occur thereby avoiding injury to the shaft 10 or the element 14.

I claim:
1. In combination,
a rotary shaft member,
a member mounted on said shaft for movement therewith, and
a slip clutch interposed between said members and comprising
a split sleeve in surrounding relation to said shaft and in frictional engagement with one of said members,
a split band disposed between said sleeve and one of said members and having a plurality of resilient corrugations for providing a spring force to maintain said frictional engagement, and
means for preventing relative rotational movement of said split sleeve and said split band with respect to each other and with respect to one of said members.
2. The combination defined in claim 1 in which said means is a key in engagement with one of said members.
3. The combination defined in claim 2 in which said key is in engagement with said shaft member.
4. The combination defined in claim 2 in which said key is in engagement with said member mounted on said shaft.
5. The combination defined in claim 1 in which said split band is in engagement with said member mounted on the shaft.
6. The combination defined in claim 1 in which said split band is in engagement with said shaft.
7. The combination defined in claim 1 in which said corrugations terminate inwardly of the side margins of said band.
8. The combination defined in claim 1 in which means is provided for retaining said sleeve and said band against longitudinal movement with respect to said shaft.
9. The combination defined in claim 8 in which said last mentioned means comprises an inwardly extending rim on said second member.
10. The combination defined in claim 1 in which retaining members are provided for retaining said second mentioned member from longitudinal axial movement on said shaft member.
11. The combination defined in claim 10 in which at least one of said retaining members is a ring in engagement with said shaft.
12. The combination defined in claim 10 in which one of said retaining members is a shoulder on said shaft.

* * * * *